US008680390B2

(12) United States Patent
McMillen et al.

(10) Patent No.: US 8,680,390 B2
(45) Date of Patent: Mar. 25, 2014

(54) FOOT-OPERATED CONTROLLER

(75) Inventors: Keith McMillen, Berkeley, CA (US);
Conner Lacy, Charlottesville, VA (US)

(73) Assignee: Kesumo LLC, Berkeley, CA (US)

( * ) Notice: Subject to any disclaimer, the term of this patent is extended or adjusted under 35 U.S.C. 154(b) by 410 days.

(21) Appl. No.: 12/904,657

(22) Filed: Oct. 14, 2010

(65) Prior Publication Data
US 2011/0088536 A1    Apr. 21, 2011

Related U.S. Application Data

(60) Provisional application No. 61/252,426, filed on Oct. 16, 2009.

(51) Int. Cl.
*G10H 1/32* (2006.01)
*G10H 3/00* (2006.01)

(52) U.S. Cl.
USPC .................................. 84/746; 84/721; 84/730

(58) Field of Classification Search
USPC ............................ 84/721, 744, 225, 426, 730
See application file for complete search history.

(56) References Cited

U.S. PATENT DOCUMENTS

| | | | | |
|---|---|---|---|---|
| 5,131,306 A | * | 7/1992 | Yamamoto | 84/19 |
| 5,429,092 A | * | 7/1995 | Kamei | 123/399 |
| 5,866,829 A | * | 2/1999 | Pecoraro | 84/177 |
| 5,878,359 A | * | 3/1999 | Takeda | 701/29.2 |
| 6,215,055 B1 | * | 4/2001 | Saravis | 84/422.1 |
| 7,157,640 B2 | * | 1/2007 | Baggs | 84/731 |
| 7,332,670 B2 | * | 2/2008 | Fujiwara et al. | 84/744 |
| 7,608,776 B2 | * | 10/2009 | Ludwig | 84/721 |
| 7,754,956 B2 | * | 7/2010 | Gain et al. | 84/615 |
| 7,855,718 B2 | | 12/2010 | Westerman | |
| 7,928,312 B2 | | 4/2011 | Sharma | |
| 2007/0234888 A1 | * | 10/2007 | Rotolo de Moraes | 84/730 |
| 2008/0158145 A1 | | 7/2008 | Westerman | |
| 2008/0254824 A1 | | 10/2008 | Moraes | |
| 2009/0049980 A1 | | 2/2009 | Sharma | |

FOREIGN PATENT DOCUMENTS

DE   112010004038.9   10/2010
WO   2011/047171      4/2011

OTHER PUBLICATIONS

International Search Report dated May 27, 2011, PCT Application No. PCT/US2010/052701.

* cited by examiner

*Primary Examiner* — Jeffrey Donels
(74) *Attorney, Agent, or Firm* — Weaver Austin Villeneuve & Sampson LLP

(57) ABSTRACT

Highly expressive and flexibly programmable foot-operated controllers are described. Specific implementations are intended for musical applications and allow musicians an unprecedented degree of control of a wide variety of musical components and subsystems for recording and/or performance.

25 Claims, 11 Drawing Sheets

FOOT-OPERATED CONTROLLER

RELATED APPLICATION DATA

The present application claims priority under 35 U.S.C. 119(e) to U.S. Provisional Patent Application No. 61/252,426 for FOOT OPERATED CONTROLLER filed Oct. 16, 2009, the entire disclosure of which is incorporated herein by reference for all purposes.

BACKGROUND OF THE INVENTION

The present invention relates to programmable controllers and, more particularly, to foot-operated controllers configured to control a wide variety of systems including, for example, musical components and subsystems in the context of recording and performance.

Almost all foot-operated effects switches employed by musicians to date have been large and heavy with limited displays, limited input capabilities, and limited control capabilities. These switches, which typically only have "on" and "off" states, are generally only capable of controlling a single effect. As a result, a musician needs one switch for each effect being controlled. Given the size and weight of these conventional switches, there are obvious and serious limitations to their effective use; particularly for musicians who travel a considerable amount, i.e., most musicians. This outdated technology also prevents artists from taking full advantage of the myriad electronic and software tools now available to musicians to push the boundaries of artistic expression.

SUMMARY OF THE INVENTION

According to the present invention, highly expressive and flexibly programmable controllers are provided. According to various embodiments, a controller includes a plurality of pressure-sensitive regions arranged on a substrate. Each pressure-sensitive region has one or more sensors associated therewith configured to generate one or more output signals that are monotonically representative of time-varying pressure applied to the one or more sensors via the associated pressure-sensitive region. A processor is configured to receive the one or more output signals from the one or more sensors associated with each pressure-sensitive region and generate control information in response thereto. The control information is for controlling operation of one or more processes or devices in communication with the controller.

According to more specific embodiments, there are two or more sensors associated with each pressure-sensitive region, and the one or more output signals generated by the two or more sensors are also representative of one or more directions of the pressure applied to the pressure-sensitive region. According to an even more specific embodiment, the one or more directions are relative to a surface of the pressure-sensitive region and include a clockwise rotation, a counter-clockwise rotation, a first linear direction along a first axis, and a second linear direction along a second axis.

According to specific embodiments, each of the sensors includes a piezo-resistive material having an electrical resistance which changes with the pressure.

According to specific embodiments, at least some of the control information includes musical instrument digital interface (MIDI) messages, and the controller further includes a MIDI interface configured to facilitate communication of the MIDI messages from the processor to an external MIDI device.

According to specific embodiments, the one or more processes or devices include a computing device on which a software application is running, and the control information is provided to the computing device for use by the software application.

According to specific embodiments, the control information includes either or both of musical instrument digital interface (MIDI) messages or Ethernet messages.

According to specific embodiments, the processor is programmable to save one or more groups of settings for each pressure-sensitive region corresponding to the control information for that pressure-sensitive region. According to still more specific embodiments, the processor is programmable to save groups of settings for each of the pressure-sensitive regions collectively as scenes. According to still more specific embodiments, the processor is programmable to save a sequence of scenes as a setlist.

According to specific embodiments, the processor is programmable to configure sensitivity to the pressure for the one or more sensors associated with each pressure-sensitive region. According to more specific embodiments, the processor is programmable to configure sensitivity to the pressure for each of one or more directions of the pressure.

According to specific embodiments, the controller includes navigation controls configured for selecting a functionality of each of the pressure-sensitive regions.

According to various embodiments, computer-implemented methods and computer-program products are provided for configuring a controller having a plurality of pressure-sensitive regions configured to generate output signals that are monotonically representative of time-varying pressure applied to each of the pressure-sensitive regions. The output signals are also representative of one or more directions of the pressure applied to each of the pressure-sensitive regions. The controller also includes a processor configured to receive the output signals and generate control information in response thereto. According to these computer-implemented methods and computer-program products, the processor is programmed to configure sensitivity to the pressure for each of the one or more directions for each pressure-sensitive region. In addition, the control information corresponding to each of the pressure-sensitive regions is mapped to one or more destination processes or one or more destination devices thereby facilitating control of the destination processes or destination devices by the controller.

According to more specific embodiments of such computer-implemented methods and computer-program products, the processor is programmed to save one or more groups of settings for each pressure-sensitive region corresponding to the control information for that pressure-sensitive region; to save a groups of settings for each of the pressure-sensitive regions collectively as scenes; and to save a sequence of scenes as a setlist.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Embodiments of the present invention relate to configurable control systems that are lightweight, durable, and flexibly programmable for use in a wide variety of applications. A particular class of embodiments are implemented as foot-operated controllers. Still more specifically, embodiments will be described herein with reference to particular applications of such foot-operated controllers that are intended for use by musicians to control a wide variety of components and processes during recording and performance. However, it should be noted that the scope of the invention should not be limited by reference to such applications. To the contrary, embodiments of the present invention may be used in a wide variety of contexts to facilitate control of a wide range of processes, devices, and systems.

Figure 1:
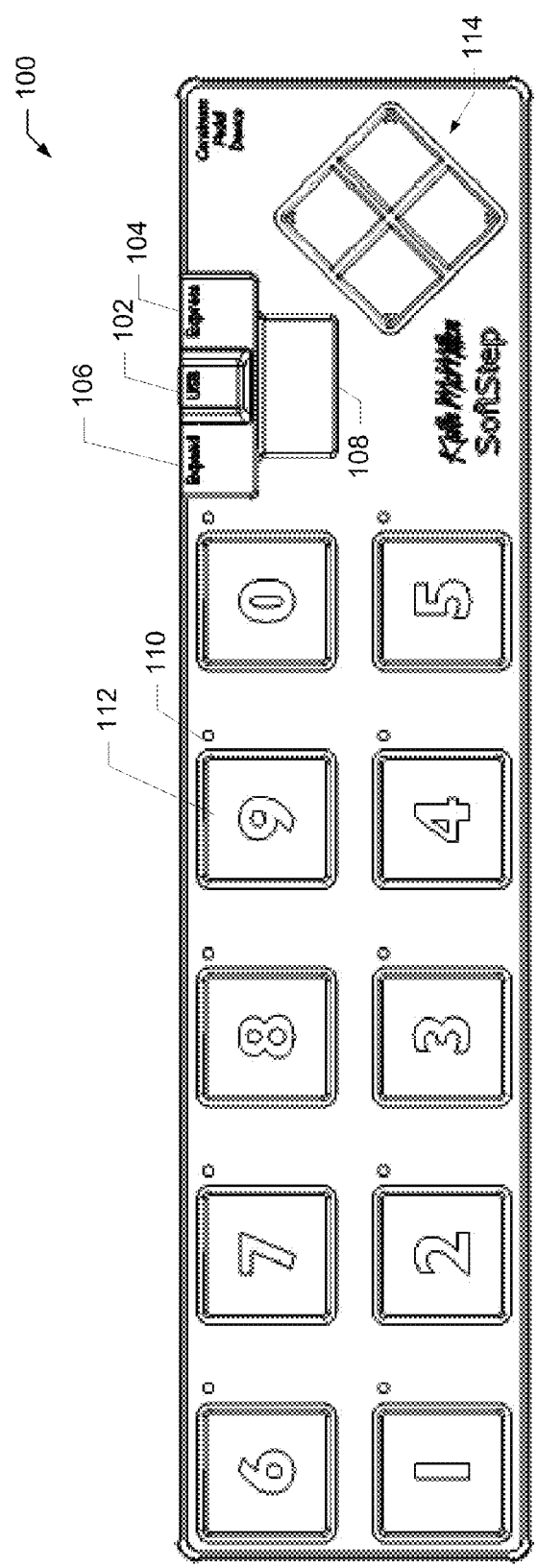
FIG. 1 is a top view of a foot-operated controller designed in accordance with a specific embodiment of the invention.

A class of embodiments of the invention will now be described using the name SoftStep™ or SoftStep™ controller to refer to the foot-operated controllers. The SoftStep™ (a top view of which is shown in FIG. 1) is a lightweight, compact, and highly expressive foot-operated controller. The depicted implementation 100 of the SoftStep™ has a USB port 102 by which the SoftStep™ may be connected to an external computer, and through which power may be delivered to the SoftStep™. An expression port 104 is provided for plugging in a volume or expression pedal. There is also an expansion port 106 for a musical instrument digital interface (MIDI) expander (described below) that enables use of the SoftStep™ without a computer to control, for example, a MIDI synthesizer and/or rack. According to some implementations, power can also be supplied through the expansion port. The SoftStep™ is provided with backlighting so that its controls can be seen well in low lighting situations, e.g., on stage. There is a 4-character alphanumeric display 108 that is user programmable. There are also LEDs 110 for each key 112 that can be programmed to display the user's choice of data. The depicted implementation of the SoftStep™ is rubberized and has a carbon-fiber back to give it strength and stability, although a wide variety of other materials are contemplated for various implementations.

Figure 2:
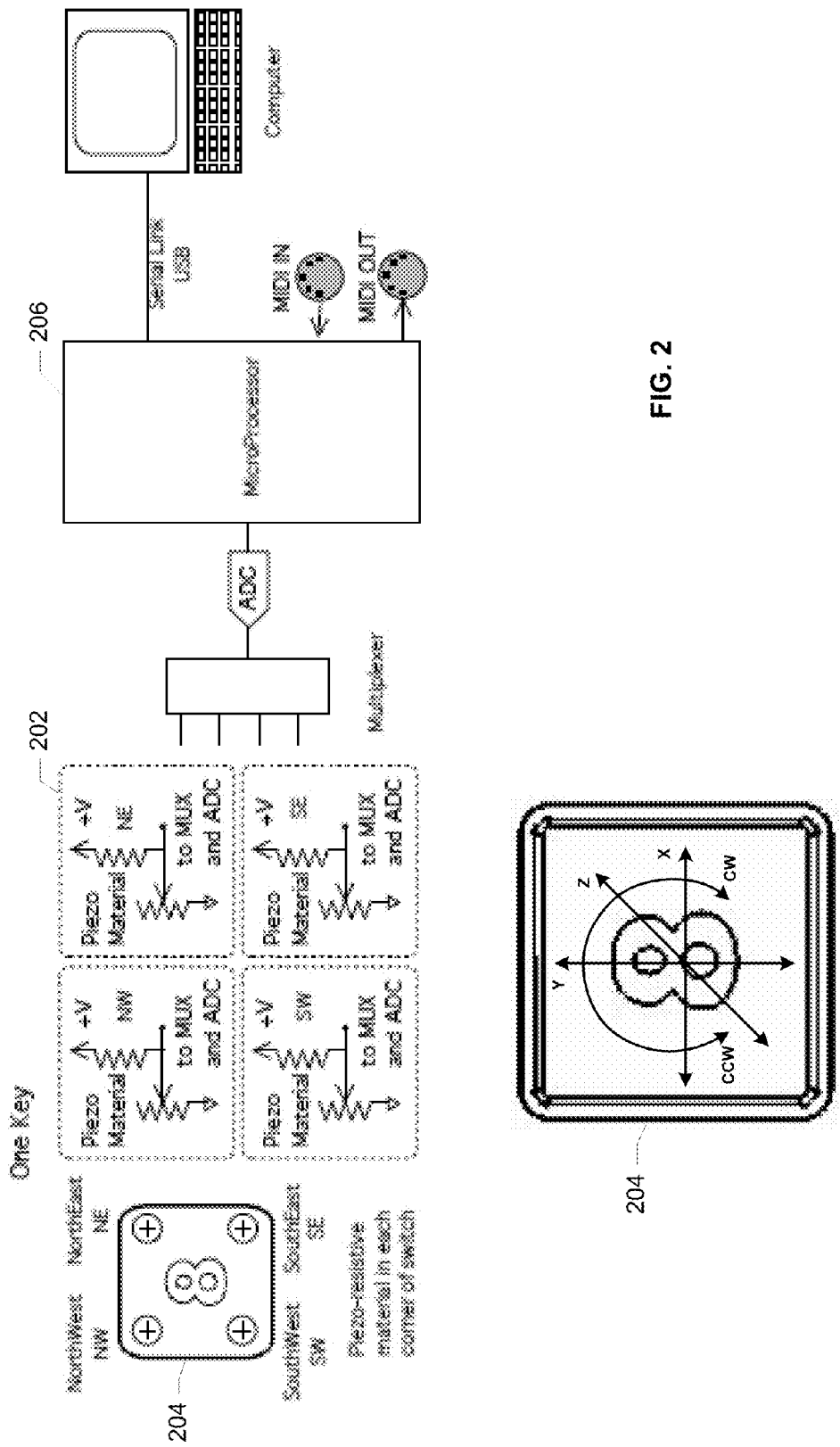
FIG. 2 is a block diagram illustrating components and operation of a foot-operated controller designed in accordance with a specific embodiment of the invention.

FIG. 2 is block diagram of a portion of a SoftStep™ implemented according to a specific embodiment of the invention. According to the depicted embodiment, four pressure sensors 202 (e.g., piezo-resistive pads) are located underneath and in the corners of each numbered button or key 204 and provide a continuous range of input instead of just an "on" or "off" state. It will be understood that any of a variety of pressure sensors and pressure sensitive materials may be employed to implement sensors 202. It will also be understood that a fewer or greater number of sensors may be employed to achieve some or all of the functionalities enabled by the configuration shown. For example, embodiments are contemplated in which three sensors are configured in a triangular arrangement. Embodiments using two sensors for each key pad, while likely to provide a lesser level of control, are also contemplated.

A processor 206 (Silicon Laboratories 8051F344) converts the sensor outputs to control commands for corresponding effects. It will be understood that processor 206 may be implemented using any of a wide variety of suitable devices known to those of skill in the art. The operation of particular implementations of the code that governs the operation of processor 206 may be understood with reference to the various embodiments described herein. Such code may be stored in physical memory or any suitable storage medium associated with the processor, as software or firmware, as understood by those of skill in the art. However, it should be noted that the use of a processor or similar device is not necessary to implement all aspects of the invention. That is, at least some of the functionality described herein may be implemented using alternative technologies without departing from the scope of the invention. For example, embodiments are contemplated which implement such functionalities using programmable or application specific logic devices, e.g., PLDs, FPGAs, ASICs, etc. Alternatively, analog circuits and components may be employed for some functionalities. These and other variations, as well as various combinations thereof, are within the knowledge of those of skill in the art, and are therefore within the scope of the present invention.

According to some embodiments the multiple sensors (e.g., one in each corner of a particular button) enable the detection of motion, i.e., captured in the time-dependent pressure exerted on the different sensors. This allows, for example, the user to roll his foot clockwise or counter-clockwise to effect changes such as, for example, turning the volume or emphasis up or down for a particular channel or effect. Other motions, e.g., rocking back and forth or side to side, might also be captured by various sensor configurations contemplated by the present invention.

In the embodiments depicted in FIGS. 1 and 2, the four corner piezo-resistive pads in each key are referred to as North West (NW), South West (SW), North East (NE), and South East (SE). As shown in FIG. 2, each key is responsive to 5 degrees of control: in the X-axis and Y-axis, clockwise (CW) rotation, counter-clockwise (CCW) rotation, and pressure (Z-axis). Four piezo-resistive pads (not shown) in the diamond-shaped navigation pad (Nav Pad) 114 are referred to as North (N), South (S), East (E), and West (W). Each of the piezo-resistive pads in the SoftStep™ sends 7-12 bit data to the processor from which the sources are derived. As will be discussed in greater detail below, these control sources are mappable to any MIDI destination or Ethernet destination (e.g., open sound control (OSC)). Table 1 summarizes source derivation according to a particular embodiment of the invention.

TABLE 1

| Sources | Derivation |
| --- | --- |
| Pressure Live | Averages the total pressure of the piezos per key. (NW + SW + NE + SE)/4 = Pressure Live. A variation for seated use would take the largest of the 4 values = Pressure Live. |
| X Live, Y Live Polar (circular) | Plots the relative location of pressure in the Cartesian plane. When no pressure is applied to the key, coordinates are (64, 64). If all pressure is applied to NW piezo, coordinates are (0, 127), NE (127, 127), SW (0, 0), SE (127, 0). (SW − NW) = x, (SE − NE) = y; Convert from Cartesian coordinates to polar where x is the real input and y is the imaginary. Add 0.785398 to phase, and convert back to polar coordinates, with additional scaling. |
| Pressure Latch, X Latch, Y Latch | Same as live parameters above, except when the user removes foot from key, the value remains. All live values are, in addition, delayed in software to make latching possible. |
| X Increment | If pressure is weighted negatively or positively along the X-axis, add/subtract to the current value in proportion to the weight's magnitude. |
| Y Increment | Same as X Increment but measured along the Y-axis. |
| Rotation | Assign a target value to each piezo. When the pressure on one piezo exceeds the others, slew from the current value to the value assigned to that particular piezo. |
| Rotation Rel. | Same as Rotation above except that when the user initially applies significant pressure to a key, rotation value initializes to 63, and one navigates to a new value from this starting point. |
| Foot On | If the total pressure (derived from pressure live) exceeds a designated threshold, then Foot On goes true. |
| Foot Off | If the total pressured falls below a designated threshold, the Foot Off goes true. |
| Wait Trig | If a Foot On is detected, and remains true for a specified duration, Wait Trig outputs the total pressure applied to that key at the moment that duration has elapsed. After the pressure value is ouput, Wait Trig returns to zero after another specified duration. |
| Fast Trig | Same as Wait Trig, with minimal delay. |
| Dbl Trig | Same as Wait Trig, except Dbl Trig must detect a Foot On, and Foot Off, and an additional Foot On (two Foot On events) in a designated amount of time. Like a double click on a mouse. |
| Long Trig | Same as Wait Trig, with a longer duration. |
| Off Trig | Same as Foot Off, except that after a specified duration after a Foot Off event, Off Trig returns to a value of 0. |
| Delta Trig | If the change in pressure exceeds a user-defined value in the positive direction within a given amount of time, output the total pressure at the moment the change in pressure occurred. This allows multiple triggers without requiring the pressure to fall below the Foot Off threshold. |
| Wait Trig Latch, Fast Trig Latch, Dbl Trig Latch, Long Trig Latch | Same as Trig sources above, except that the output values do not return to zero. |
| Nav Y | If the pressure exceeds a user-defined value on the North quadrant of the Nav Pad, then increase the current value of the Nav Y source by one. If the pressure exceeds a user-defined value on the South quadrant of the Nav Pad, then decrease the value of the Nav Y source by one. The source's value cannot be increased or decreased by more than one until the pressure of the activated quadrant has fallen below the defined pressure threshold value. |
| Nav Yx10 & Key | Multiplies the Nav Y source by 10, and adds the value of the key number to it. If Nav Y = 10, and key 1 is hit, Nav Yx10 & Key outputs 11. |
| Key Value | If total pressure of a key exceeds the user-defined pressure threshold (i.e. Foot On), then output the value of the key pressed (0-9). |
| Prev Key Value | When a new Key Value is received, Prev Key Value outputs the previous value. If the user presses key 4, and then presses key 7, Prev Key Value outputs a value of 4. |
| This Key Value | Same as Key Value, except outputs the value of the key pressed, only if it is equal to the value of the key in which the source is selected. |

TABLE 1-continued

| Sources | Derivation |
|---|---|
| Key # Pressed | Same principle as Key Value. If Key 3 Pressed is selected, and the pressure exceeds the threshold of key three, Key 3 Pressed outputs a 1. If any key other than 3 are pressed, Key 3 Pressed outputs 0. |

For some implementations, keys may be near each other as this is desirable to make a smaller device. In order to prevent accidental key operations from a large foot or shoe, several isolation functions may be employed. According to one embodiment, such an isolation function operates by shutting off data input from keys that are not pressed. For example, if the pressure threshold is exceeded on key 1, then all data from other keys' piezo-resistive pads are deactivated until key 1 is relinquished. Another more advanced approach operates by shutting off data from keys adjacent to the initial desired key after it is pressed. This allows two keys to operate—one per foot—without unintended key activity.

The multiple sensor arrangements for each key may also be useful for determining which of the closely-spaced keys was selected. For example, if the NW and SW sensors for key 7, the NE and SE sensors for key 9, and the NW and NE sensors for key 3 were activated in conjunction with most or all of the sensors for key 8, then processor could determine that the user intended to select key 8.

Figure 3:
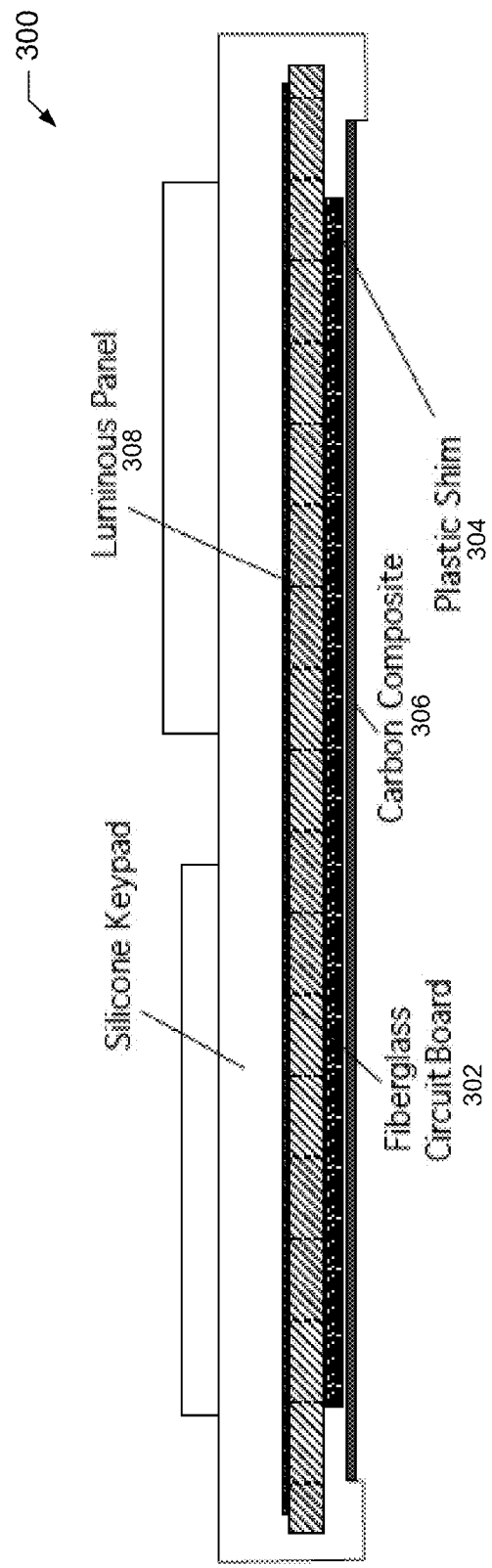
FIG. 3 includes a cross-sectional view of a foot-operated controller designed in accordance with a specific embodiment of the invention.

FIG. 3 shows a cross-section of a SoftStep™ 300 implemented according to a specific embodiment of the invention. In order to get enough stiffness along the longitudinal axis of the SoftStep™, a laminate of fiberglass (e.g., circuit board 302), a spacer (e.g., plastic shim 304) and carbon composite 306 is employed to act like a box beam. Stiffness is advantageous for keeping the sensors aligned and preventing the electronic components from failing.

Figure 4:
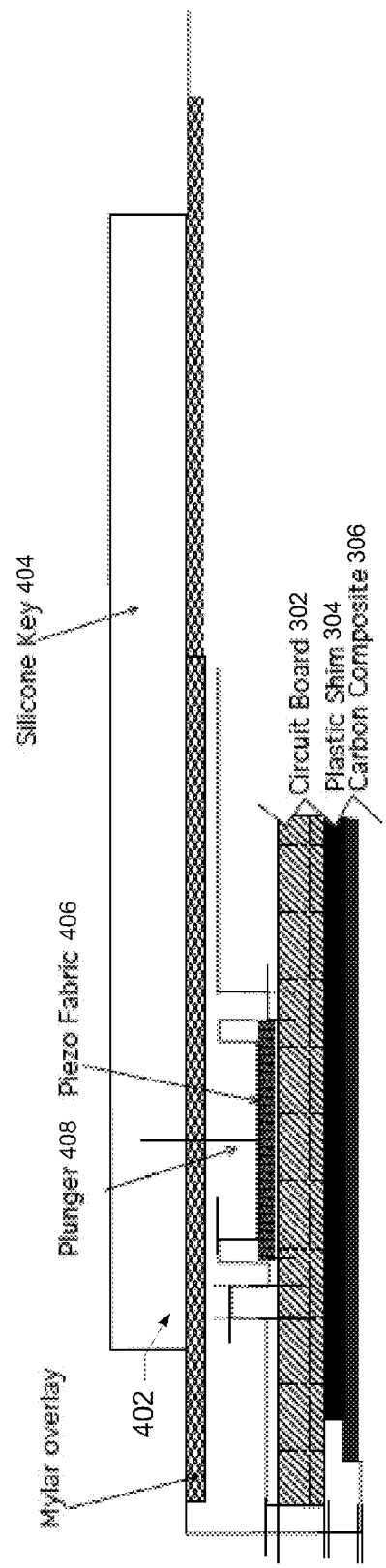
FIG. 4 includes a cross-sectional view of one sensor of one key of a foot-operated controller designed in accordance with a specific embodiment of the invention.

FIG. 4 is a cross-sectional view of a piezo-resistive sensor 402 under one corner of a key pad 404 for a foot-operated controller implemented according to a particular embodiment of the invention. Piezo-resistive material 406 is glued to a plunger 408 at ½ of the piezo's thickness and held just off a pair of traces on a printed circuit board (PCB) 302. When pressure is exerted on key pad 404, plunger 408 moves relative to the reliefs surrounding it. A monotonic representation of the pressure being exerted on the sensor is then generated as a voltage as the resistance of the piezo-resistive material in contact with the circuit traces changes correspondingly. This same geometry may be used for all piezo-resistive sensors in the SoftStep™.

Illumination of the keys and navigation pad (e.g., luminous panel 308) may be effected in a number of ways. For example, arrays of LEDs might be employed. Alternatively, given that it may be difficult in some applications to illuminate a relatively broad area with an LED, as well as the potential for hot spots, embodiments are contemplated that employ electroluminescent resources (e.g., patterned sheets, tubes, etc.) to selectively illuminate portions of the SoftStep™ display area. Still other alternatives might employ phosphorescent materials. In cases where active sources of illumination are employed, the intensity of the illumination may also be modulated to correspond to various inputs, e.g., pressure from the user's foot, musical inputs (e.g., throbbing to the beat), etc. The light intensity may also be automatically dimmed when the pad is not in use.

Figure 5:
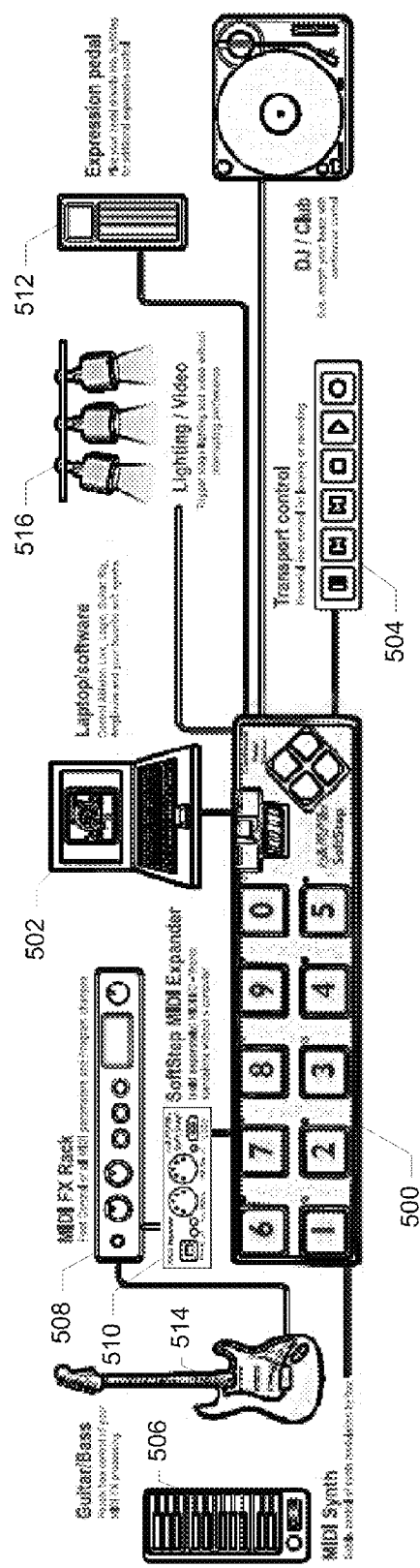
FIG. 5 is a system diagram illustrating various musical components and sub-systems connected to a foot-operated controller designed in accordance with a specific embodiment of the invention.

FIG. 5 is a diagram illustrating various musical components and sub-systems connected to a SoftStep™ 500 designed for use in musical applications. The SoftStep™ may be used in conjunction with software on a connected computer 502 (e.g., via USB) to control effects, looping, sample triggering, etc., using effects processors, MIDI devices and systems, OSC devices and systems, etc. The SoftStep™ may be used with digital audio workstations (DAWs) to control punch-in, panning, levels, and transport functions (e.g., 504). According to some embodiments, the SoftStep™ may be used in standalone mode, i.e., without an external computer, to control a MIDI synthesizer 506 and/or a MIDI rack 508 with a separate MIDI Expander 510 connected via a USB expansion port. An expression pedal 512 may be connected to the SoftStep™ via an analog expression port. A musical instrument 514 may be connected to an effects processor (e.g., in MIDI rack 508) via an instrument cable (for use without computer), or connected to an audio interface that is connected to the computer (for use with computer). In addition to myriad ways of controlling sound, the SoftStep™ can be used with anything else that will accept MIDI or OSC data, e.g., lighting effects or video (516), robotics, pyrotechnics, and more.

MIDI expander 510 is an optional device that enables use of the SoftStep™ to control MIDI devices and systems without an external computer. Once the SoftStep™ is configured with control mapping software as described below, any MIDI device may be connected to and controlled by the SoftStep using the MIDI expander. The MIDI expander contains a driver and optical isolator as per MIDI requirements to buffer the RX and TX signals coming from the SoftStep's CPU UART. The MIDI expander connects to the SoftStep using a USB A-to-MIDI USB 4-pin cable. The MIDI expander is connected to power by using a USB A-to-USB B cable and a USB power plug. Other expanders, such as an analog control voltage output group or a bank of relay closures for hardware effects switching can be daisy-chained on the expander bus for greater flexibility. Through the use of such expanders, control data can be simultaneously available to different targets through different hardware standards, e.g., MIDI, Control Voltage DACs, relays, etc.

According to various embodiments of the invention, the SoftStep™ is employed with a software application (the SoftStep™ application) on a USB connected computer (e.g., computer 502) to enable the creation of powerful control parameters. The SoftStep™ application may be implemented using any of a wide variety of software and programming tools and may employ any of a wide variety of connection types, communication protocols, and messaging formats. The computing platform on which the SoftStep™ application operates uses memory to store data, algorithms, and program instructions configured to enable various of the functionalities related to the present invention. Such data, algorithms, and program instructions can be obtained from any of a variety of computer-readable storage media examples of which include magnetic and optical media as well as solid state memory and flash memory devices.

The SoftStep™ application works with the SoftStep™ foot-operated controller to manipulate sensor data that gives the user a nearly infinite degree of control and possibility. As discussed above, the SoftStep™ has 10 key pads, each with multiple sensors, enabling 5 degrees of freedom that are unique to each key. As shown in FIG. 2 on the enlarged representation of key pad "8," these parameters include X-axis, Y-axis, clockwise (CW) rotation, counter-clockwise (CCW) rotation, and pressure (Z-axis). These sources can be mapped to destinations up to six times for each key providing the possibility of a dense data source from a single motion of the foot. It should be noted that, while operation of the SoftStep™ application is described herein with reference to a particular implementation of the SoftStep™ controller, the functionalities of the SoftStep™ application are not limited to the controller design described. That is, the various functionalities of the SoftStep™ application may be employed to interface with and configure virtually any controller intended for similar applications.

Figure 6:
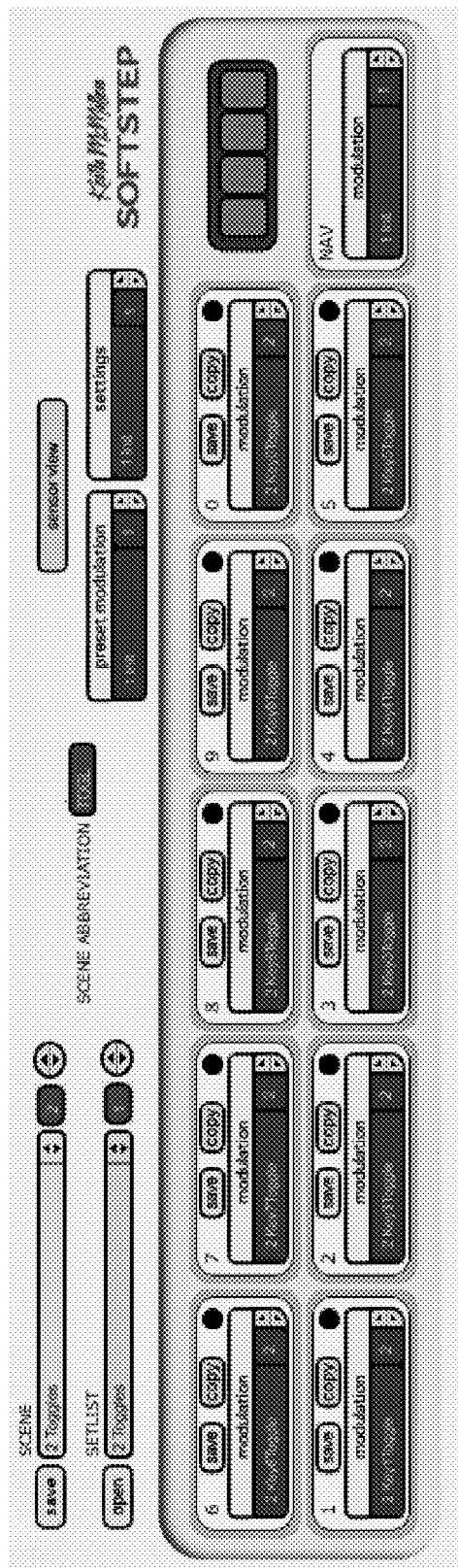
FIGS. 6-12 are examples of interfaces of a software application which may be used to configure and control operation of a foot-operated controller designed in accordance with a specific embodiment of the invention.

The main window for a particular implementation of the SoftStep™ application is shown in FIG. 6. The controls for the numbered key pads and the Nav Pad are arranged in a manner similar to the corresponding controls on the SoftStep™ itself. Each key and the Nav Pad has a corresponding modulation window (discussed below) in which the sources visible from the sensor view (discussed below) can be mapped to various destinations of the user's choice using modlines. These include MIDI, tape recorder style Transport Control destinations, or Ethernet. As will be discussed, each modulation window includes 6 modlines which means that each of the 10 SoftStep™ keys can be configured to control 6 different MIDI messages. After the modlines are set up, this information may be saved into presets for each key. The presets may then be saved into "scenes" from the main window. Additionally, the user can move from scene to scene in whatever order he chooses by using a setlist.

The x-axis of the diamond-shaped Nav Pad is configured to scroll through the scenes in a setlist. Each time the user navigates back to any scene in the current setlist, the last state of that scene will be remembered so the user can pick right back up where he left off. For example, assume that for one scene all of the program change messages have been set up. Once these edits are complete, the user navigates to a different scene, e.g., one that is set up to control a looper. After turning on some loops, the user then navigates back to the program change scene, for which the last program change message sent out will be recalled. Then, when the user navigates back to the looper, the LED indicators representing the loops turned on the last time the user was in that scene will be recalled. Then, by tapping either up or down on the Nav Pad, the last data sent from that scene will be displayed in the alpha numeric display until another key is pressed.

The SoftStep™ application also provides the user with the ability to alter the sensitivity settings for the numbered keys and the Nav Pad. Accessible from the main window, the settings window also enables the user to set up a MIDI input device for use with the MIDI expander, and to calibrate an expression or volume pedal for use with the SoftStep™ expression port. MIDI input can then be used as sources in the Preset Modulation window, also accessible from the Main window. The user can use Preset Modulation to allow other MIDI controllers to change scenes or presets for the keys or Nav Pad.

Referring once again to FIG. 6, the main window of the SoftStep™ application includes 10 blocks that correspond to the 10 numbered keys on the SoftStep™ controller. Each numbered block provides access to presets for the corresponding key. These presets can be edited by selecting the modulation box within each key block. In addition, when the user steps on a key pad on the SoftStep™ controller, a blue background appears around the corresponding key block in the main window of the SoftStep™ application. To the right of the key blocks are four dark grey boxes that mirror what is displayed on the LED display on the SoftStep™ controller. Under these is the control block for the Nav Pad which allows the user to control the settings for the diamond-shaped navigation pad on the right side of the SoftStep™ controller.

The top left corner of the main window of the SoftStep™ application includes the scenes control block which allows the user to save and recall presets that belong to particular scenes. Each scene may encompass 10 presets of the 10 keys, a preset modulation, and the presets for the Nav Pad. Below the scenes control block is the setlist control block which allows the user to specify an order for a group of scenes that is useful, for example, for a performance. That is, the order in which scenes are created and saved during programming of the SoftStep™ might not be the order the user wants for a given performance. The use of setlists allows the user to save and navigate through the scenes in any order.

The scene abbreviation allows the user to set what the SoftStep™ display reads when a scene is first selected. The preset modulation control allows use of the MIDI input sources to control presets. For example, the user might set up a MIDI input that can be used to change the preset to which key 1 is set.

To the right of the preset modulation control is the settings control, selection of which opens the settings window and allows selection of presets that determine how the application will scale and accept data from the SoftStep™ controller. The settings window also allows the user to set up an Ethernet OSC port and declare MIDI channels. Above these controls is the sensor view button. When selected, a user interface is presented that shows how the SoftStep™ controller is sensing data.

As discussed above, at the top of the main window is the control block that enables the user to save scenes. Also each key block provides the controls that enable the user to save presets for the corresponding keys. The manner in which each facilitates saving presets or scenes is substantially the same. To save a scene or preset, the user selects the "Save" button in the corresponding control block and enters the name of the scene or preset in the box presented (not shown). Multiple presets may be saved for each. And once saved, each preset may be readily recalled using the increment/decrement control in either the key's modulation window or from the SoftStep™ application main window. In addition, when scenes or presets are saved in with the SoftStep™ application this information is stored in a folder and may be retrieved if lost or if the user upgrades to a newer version of the software.

According to some embodiments, the SoftStep™ application enables the user to program the presets for the keys to recall initial states the first time a scene is recalled at the beginning of a session, e.g., when the SoftStep™ application is started and/or the SoftStep™ controller is turned on. After a scene is recalled for the first time in a session, the user's interaction with the SoftStep™ will then change the states of the keys. As discussed above, if the user navigates to a different scene and then returns, the last state of that scene will be recalled rather than initial states.

Figure 7:
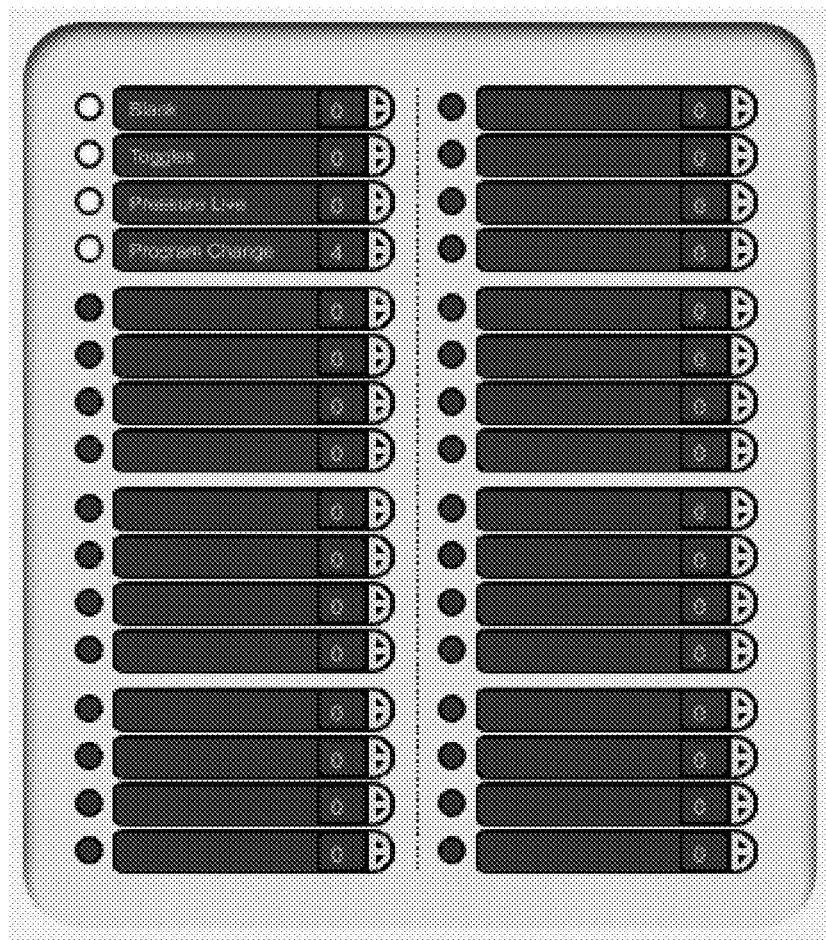

Selection of the "Open" button in the setlist control box in the main window of the SoftStep™ application results in presentation of the setlist window for that setlist as shown in FIG. 7 which includes an array of text fields and number boxes. The circle buttons in front of each line are used to turn on or off a scene appearing in the text field. The user may select the scene in the text field by scrolling through the numbers or pressing the increment/decrement arrow controls on the right hand side. The order of scenes listed in the setlist is the order of scenes as they will be recalled using the x-axis of the Nav Pad.

Figure 8:
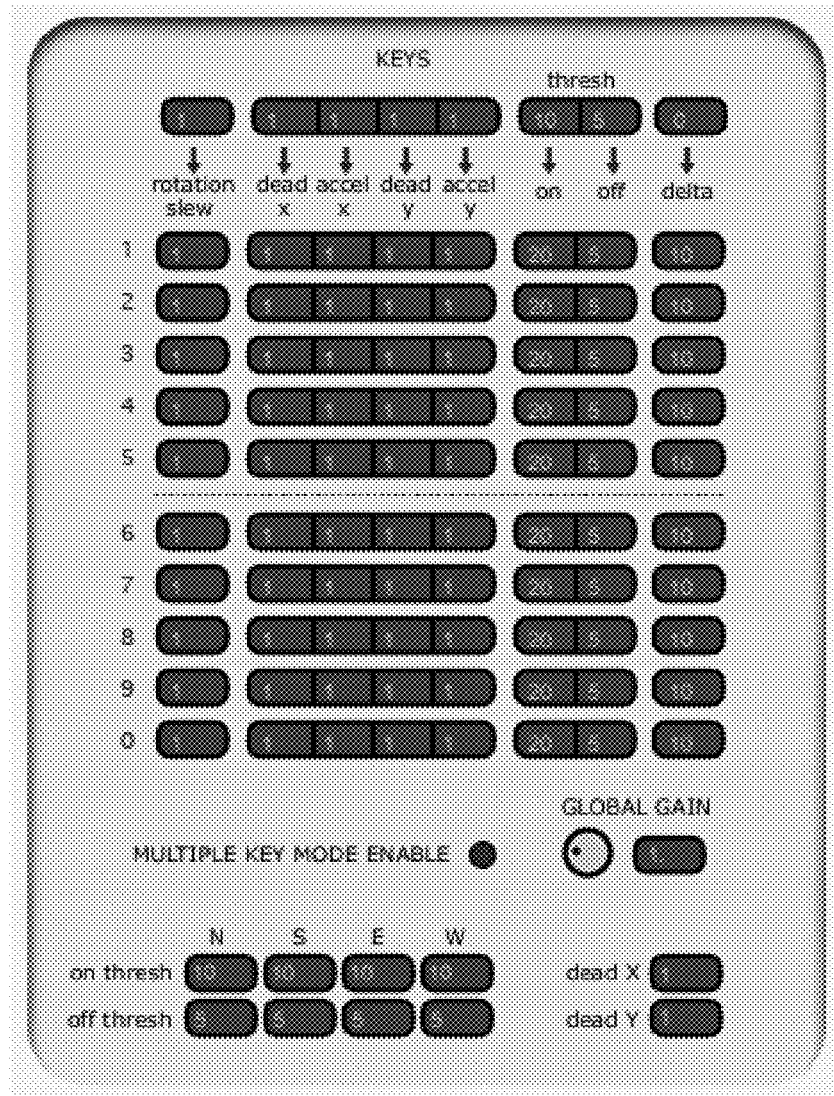

The portion of the settings window shown in FIG. 8 (accessed via the setting control block in the SoftStep™ application main window) allows the user to edit sensitivity parameters for each key. The keys settings shown in Table 2 and the Nav Pad settings shown in Table 3 may be manipulated via this portion of the settings window.

TABLE 2

| Key setting | Description |
|---|---|
| Rotation slew | rotation plots the location of your foot on the key around a dial that goes from 0-127 which is then available as a source for data mapping. The rotation slew setting allows you to add slew while scrolling through the dial values, allowing you to slow down the rotation. |
| Dead X | this parameter designates the width of the horizontal dead zone, which indicates how much more weight to one side you need to be pushing down with in order to begin incrementing or decrementing. |
| Accel X | this is how fast the inc/dec for the horizontal plane moves. The higher the value, the faster you'll move from one side to the other. |
| Dead Y | designates the width of the vertical dead zone, which indicates how much more weight to the top or bottom you need to be pushing down with to begin incrementing or decrementing. |
| Accel Y | this is how fast the inc/dec for the vertical plane moves. |
| On thresh | here you can set the sensitivity for the "foot on" threshold. For example, if set to 7 you would have to put enough pressure on the key for it to register a value of 7 before the "foot on" trigger is sent. |
| Off thresh | here you can set the sensitivity for the "foot off" threshold. For example, if set to to 7, the pressure value would have to be 7 or lower for the "foot off" trigger to register. You would want this to be lower than the "on" sensitivity. |
| Delta | If there is a positive change in pressure greater than the delta value it sends the delta trigger value that you can use as a modulation source |
| Global gain | amplifies all incoming data from each key. Adjust this first before adjusting other settings. This scales all of the sensor data from the SoftStep ™ keys and can make the SoftStep ™ more or less responsive to pressure. If you are 2 meters tall and 110 KG you would need less global gain than if you weighed half that. |
| Multiple key mode enable | turn this on to be able to use two keys at a time - one per foot. The SoftStep ™ automatically determines the key you mean to press and disallows adjacent keys from accidentally firing. Normal setting (off) allows just one key at a time to be active. |

TABLE 3

| Nav Pad Setting | Description |
|---|---|
| Dead X/Y | select the "dead zone" for the X and Y axis of the Nav Pad |
| On thresh N, S, E, W | just like for the regular keys you can set the sensitivity for the "foot on" threshold for the Nav Pad. If set to 7 you would have to put enough pressure on the key for it to register a value of 7 before the "foot on" trigger is sent. |
| Off thresh N, S, E, W | just like for the regular keys you can set the sensitivity for the "foot off" threshold. For example, if set to 7, the pressure value would have to be 7 or lower for the "foot off" trigger to register. You would want this to be lower than the "on" sensitivity. |

Figure 9:
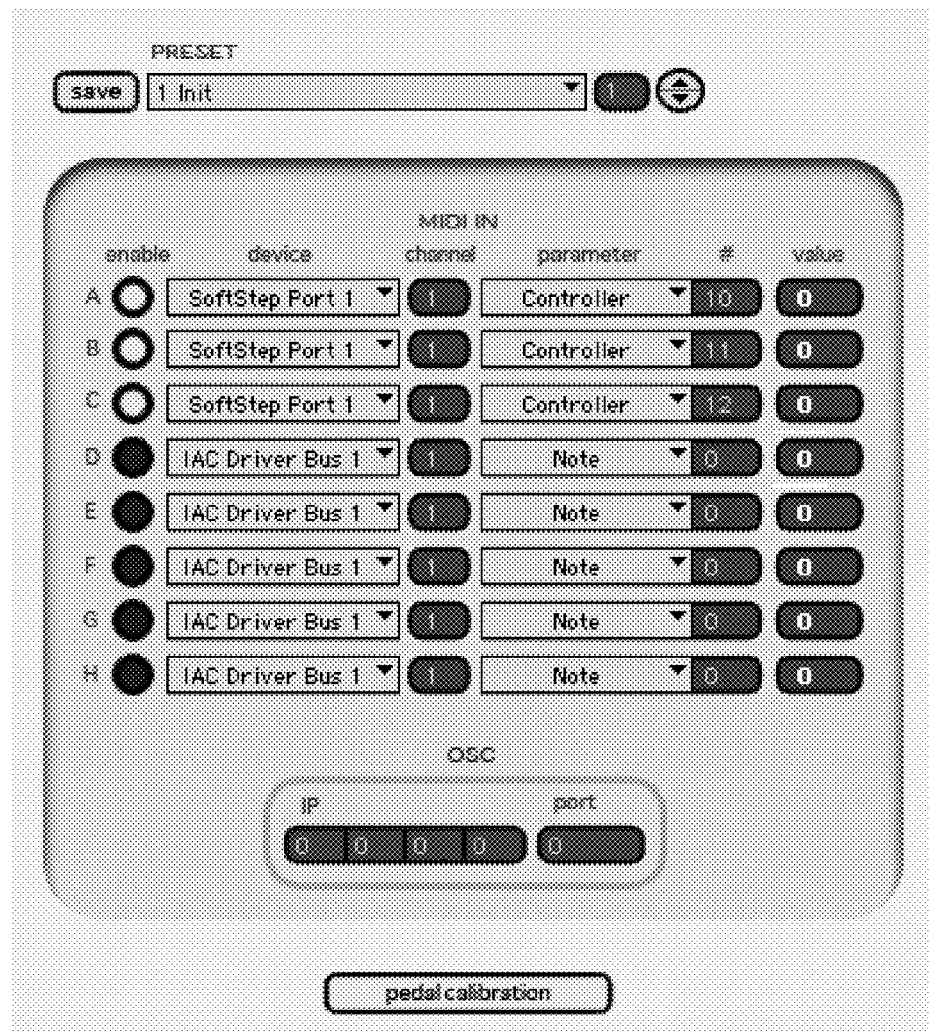

The portion of the settings window shown in FIG. 9 (accessed via the setting control block in the SoftStep™ application main window) allows the user to set up a MIDI Input device, an OSC port, and calibrate an expression pedal. The settings shown in Table 4 may be manipulated via this portion of the settings window.

TABLE 4

| Control | Description |
|---|---|
| MIDI enable | turn on or off lines that receive MIDI Input data |
| MIDI device | set where the MIDI Input data is coming from |
| MIDI channel | set which channel the MIDI Input data is coming from |
| MIDI parameter | choose between note, controller, or program change for what type of data is coming in |
| # | if you chose note or controller for your parameter then you can choose which control number or note value the data is for |
| MIDI value | shows the data coming in from the MIDI Input device |
| OSC IP | select the IP address for where the OSC is being sent to |
| OSC port | select which port the OSC output is going to |

If an expression pedal is plugged into the expression port of the SoftStep™ controller, the Pedal Calibration button shown in FIG. 9 will facilitate calibration. Selection of the Pedal Calibration opens a window which provides step-by-step calibration instructions. This interface may also be used to calibrate a volume pedal where the plug is in the Instrument Output jack of the volume pedal.

Figure 10:
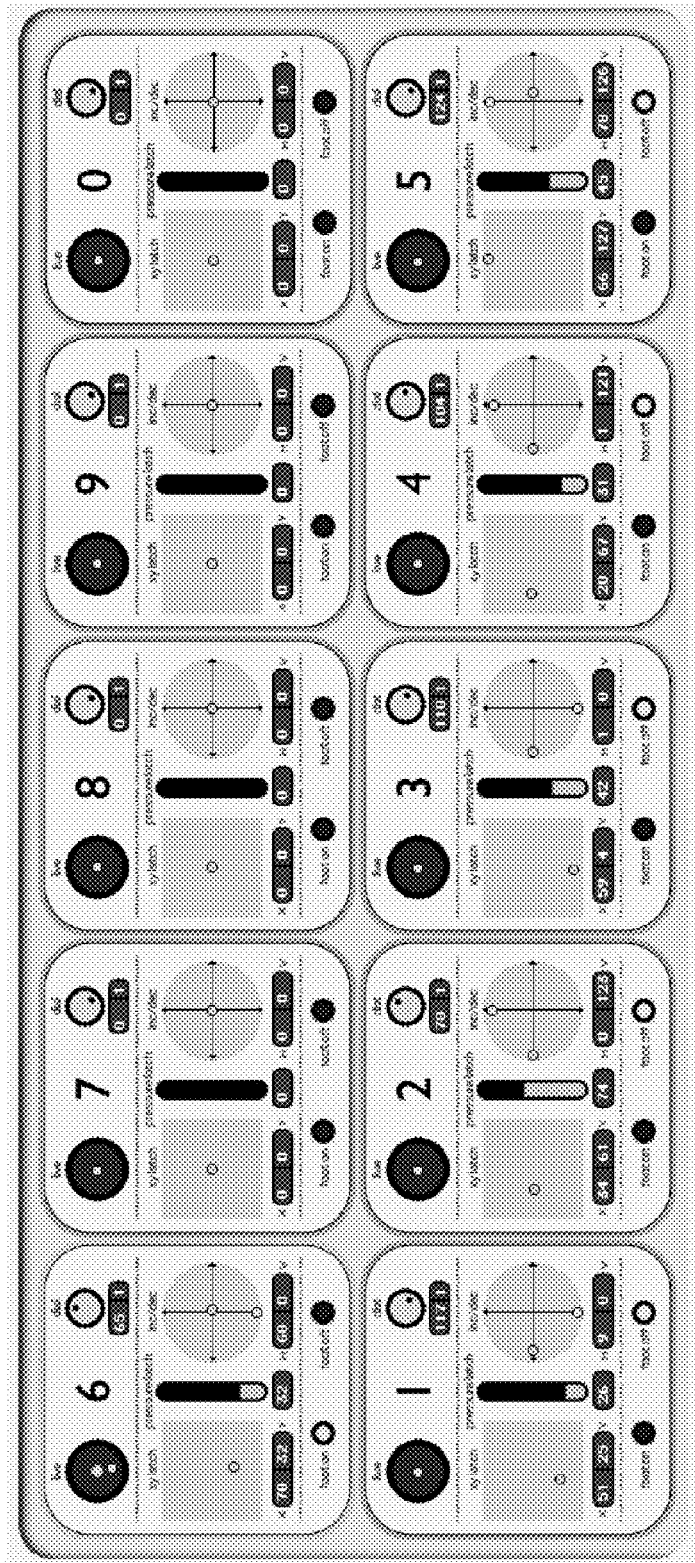

The sensor view window shown in FIG. 10 provides visual representations of the sensor data coming from the SoftStep™. Each key window displays a number of parameters for the corresponding SoftStep™ key. The rotation dial plots where the user's foot is on the corresponding SoftStep™ key around a dial that the user can rotate. For example, if the user's foot is in the bottom left corner of the key the rotation dial will be turned all the way down. The user can then turn it all the way up by rotating his foot around the key to the bottom right corner.

The xy latch display shows the x- and y-axis position of the user's foot on the key. The "latch" indicates that when the user releases the key, this value will stay where he left it. The pressure latch display shows the pressure of the user's foot on the key and will also stay where the user leaves it. The inc/dec display shows the user's foot incrementing and decrementing through the horizontal and vertical planes of the key. Stepping a few times on one side of the key results in the value incrementing or decrementing by different amounts according to the pressure. The user can also hold pressure onto one side and it will increment or decrement smoothly toward one side. These values will show up in the modlines as "horizontal" and "vertical." The dead zone and rate of change for this display may be set in the settings window.

The live display gives real-time readings of non-latching parameters, i.e., pressure, x, and y. The foot on/foot off display shows whether or not the key is active or has been active. For example, notice in FIG. 10 that some of the keys don't have the "foot on" or "foot off" indicators illuminated (i.e., keys 7-0). This indicates that these are the keys that have not yet been touched during this session, which also explains why all of these keys show their initial states for every parameter. Also notice in FIG. 10 that some of the keys have at one time been activated but are not currently activated (keys 1-5). The "foot off" indicators for these keys are on and all of the latch indications and the inc/dec and dial indicators show their last state. The only thing that doesn't latch is the live indicator. Key 6 is shown to be in use, i.e., it is highlighted in blue, the "foot on" indicator is lit, and sensor data are shown in the live display.

Referring once again to FIG. 6, some of the functions associated with each key block in the main window of the SoftStep™ application will now be discussed. Selection of the "save" button in a key block saves a preset for the corresponding key. Presets may also be saved from within the key's modulation window. Selection of the "copy" button allows the user to copy settings from one key to another. Selecting the copy button in one key block changes the copy buttons in all other keys block into "paste" buttons. The settings from the first key may then be copied into any of the other keys by selecting the corresponding paste button. Selecting the copy button in the first key block again returns the button to read "copy." The circle to the right of the copy button mirrors the programmable LED status on the SoftStep™ controller.

Figure 11:
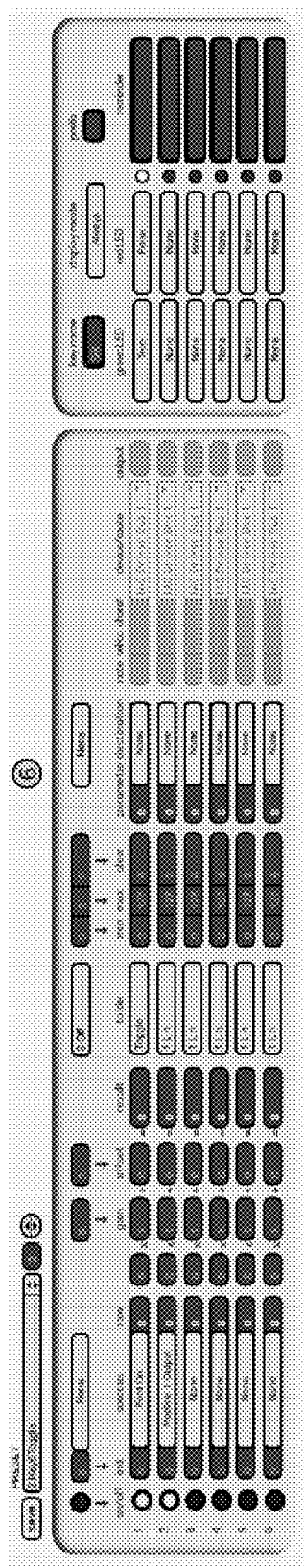

Selecting the "modulation" box in a key block brings up the modulation window for that individual key (as shown in FIG. 11) allowing the user to edit the parameters in the displayed preset. Clicking on the little arrows next to the preset number will scroll up and down through the presets saved for that modulation window.

The modulation window shown in FIG. 11 includes an array of "modlines" that can be configured for each key. In the embodiment shown, there are six modlines that can assign six parameters of the corresponding SoftStep™ key to output different types of messages. According to the depicted embodiment, each modline has the options shown in Table 5.

TABLE 5

| Modline Option | Description |
|---|---|
| On/off | click on the circle to enable the modulation line and it will show a blue-green color. When disabled, the modline on/off appears dark |
| Init | the initial value. Adjust the initial value to preview what that value does to the rest of the modline. This is also the starting value in the absence of any raw data from the source |
| Sources | Choose what data source will control the individual modline. Click on the box and many parameters will pop up in a scroll menu. For a representative list of sources see Table 6 |
| Raw | The value coming directly from the source is displayed here |
| Gain | this is the first place where you can use math to modify the signal. Whatever number is put in the gain box is used to multiply the raw value. For example if the source is X live, clicking on the gain window and typing "2" will double whatever value received from the controller |
| Offset | set a value to add or subtract from the raw value after it has been multiplied by the gain value |
| Result | the resulting value of the source modified by gain and offset |
| Table | the result value is entered into the selected lookup table, and used to plot the index on a chart. There are a number of table options, each which will affect the modulation differently as it changes value over time. There is also a toggle option |
| Min/max | The "min" and "max" in the output segment allow you to set where the index starts and ends. If the min is set to 10 and the max is set to 15, then the index will only count between 10 and 15 |
| Slew | Use slew to smooth out the index when it jumps from one number to another. The larger the slew, the slower the result will respond to the source |
| Parameter destination | Click on the drop-down menu to see the many options available: Note, CC, Bank, Program, OSC (Open Sound Control), Pitch Bend, MMC (MIDI Machine Control), Aftertouch, or Poly Aftertouch. These options are further customizable by selecting the device/route, the note, velocity or control change, or the channel # you wish to send these parameters out |

At least some of the SoftStep™ sources available in every key's modline are shown in Table 6.

TABLE 6

| SoftStep ™ Sources | Description |
|---|---|
| Pressure Live | Similar to Pressure Latch described above, but instead the value resets back to 0 when key is depressed. |
| X Live | Similar to X Latch described above, but instead the value resets back to 64 (centroid value between 0 and 127) when key is depressed. |
| Y Live | Similar to Y Latch described above, but instead the value resets back to 64 (centroid value between 0 and 127) when key is depressed. |
| Pressure Latch | This value corresponds to the overall pressure sensed by the key (a higher value indicates more pressure applied). The term "latch" indicates that after the foot is taken off, the last recorded value still remains and will not be reset back to 0 (unlike Pressure Live). |
| X Latch | This value corresponds to the overall pressure in the X or horizontal direction of the key. Applying more pressure to the right side of the key increases the value, while pressure to the left decreases. The term "latch" indicates that after the foot is taken off, the last recorded value still remains and will not be reset back to 0 (unlike X Live). |
| Y Latch | This value corresponds to the overall pressure in the Y or vertical direction of the key. Applying more pressure to the top of the pad increases the value, while pressure to the bottom decreases. The term "latch" indicates that after the foot is taken off, the last recorded value still remains and will not be reset back to 0 (unlike Y Live). |
| X Increment | This value corresponds to horizontal value in an increment/decrement style. Step a few times on the right side of the key and see the value increment by different amounts corresponding to the pressure, also try stepping a few times on the left and see the value decrement. You can also hold pressure onto one side and it will inc or dec smoothly towards one side. |
| Y Increment | This value corresponds to vertical value in an increment/decrement style. Step a few times on the top of the key and see the value increment by different amounts corresponding to the pressure, also try stepping a few times toward the bottom and seeing the value decrement. You can also hold pressure at the top or bottom and it will inc or dec smoothly towards the top or bottom. |
| Rotation | With your foot pushing down on the SoftStep ™ controller, roll the tips of your toe in a clockwise or counter clockwise oriented movement and watch the values change. |
| Rot Relative | no matter where you put your foot initially you'll get an output of 63 (the center of the dial) and then if you rotate your foot clockwise from that the value will go up. If you rotate your foot counter-clockwise from that the value will go down. |
| Foot On | This value corresponds to whether or not the key is pressed or not. 1 indicates the foot is on (true) 0 indicates foot off (false). |
| Foot Off | Opposite logic to Foot On. 1 indicates foot off (true), 0 indicates foot on (false). |
| Wait Trig | Short for trigger, the value is received only after a few seconds of your foot being pressed on the key. |
| Fast Trig | causes a trigger after the foot comes off the key in a short period of time (quick tap). |
| Dbl Trig | Short for trigger double, the value is received only when the pedal senses two quick impulsive steps onto the key. |
| Long Trig | This value corresponds to a trigger (a quick and impulsive step) without immediately taking off the foot, while instead holding it for a longer period of time. |
| Off Trig | causes a 0 to trigger when your foot comes off the key in a short period of time (quick tap). The rest of the time it outputs a 1. |

TABLE 6-continued

| SoftStep ™ Sources | Description |
|---|---|
| Delta Trig | measures change in pressure. If pressure greater than the delta setting in the settings window occurs, then you'll get a trigger. |
| Wait Trig Latch | Same as Wait Trig but the value doesn't go back to 0 after the trigger |
| Fast Trig Latch | Same as Fast Trig but the value doesn't go back to 0 after the trigger |
| Dbl Trig Latch | Same as Dbl Trig but the value doesn't go back to 0 after the trigger |
| Long Trig Latch | Same as Long Trig but the value doesn't go back to 0 after the trigger |
| Pedal | This value is received when a pedal is connected to the SoftStep ™ controller's expression port, next to the USB port. |
| Nav Pad Y | This value corresponds to top and bottom pads of diamond shaped Nav Pad on the SoftStep ™ controller. Think of this as a counter, where everytime the top pad is pressed the value one is added to the counter, and when the bottom of the Nav Pad is pressed the value one is subtracted from the counter. |
| Nav Pad Y and Key | Use this setting to reach larger numbers much quicker than Nav Pad Y. Stepping on the top pad increments the tens digit of the value, similarly the bottom pad decrements the tens digit. The final value is achieved after stepping on one of the 10 pads indicating the ones digit. For example, step on the top pad 14 times to increment the counter to 14, then hit the number 2 key, and the final value will be 142. |
| Key Value | This value corresponds to which of the 10 keys is stepped on. Stepping on key 7 gives the raw value of 7, stepping on key 2 gives the value of 2. |
| Prev Key Value | This setting remembers the order in which pads you pressed down on and outputs the last key, not the current. If you step on key 2 then key 8, the value output would be 2. |
| This Key Value | This source will output whatever key value you are on whenever you step on it. For example, if I am in the key 7 modulation window and I choose This Key Value as a source, stepping on all other key won't trigger any value except when step on key 7, and the value "7" will appear. |
| Key 1 . . . 10 Pressed | This source looks for the status of whatever key you choose. 1 is true if the corresponding key is pressed, it doesn't matter which key you are editing. For example, if I choose the Source Key 4 pressed in a modline belonging to key 7, the value will only change and become 1 when I step on pad 4 (otherwise it stays 0). |
| Mod 1 . . . 6 Output | This setting takes the output value from any of the other modlines as the raw value of its own. |
| MIDI A . . . H | These receive the values from the lettered MIDI Input in the settings window |

On the right side of the modulation window of FIG. 11 are controls for setting display information for the LED lights associated with the SoftStep™ key pads and the four-letter alpha-numeric display screen. The top row contains the settings for the alpha-numeric display screen. Setting the display mode is important for getting the desired behavior. There are 5 display modes for a particular implementation as shown in Table 7.

TABLE 7

| Display Mode | Description |
|---|---|
| None | causes the four-letter display box to go blank when using that key |
| Always | displays the key name whenever the corresponding key is the most recently activated key |

TABLE 7-continued

| Display Mode | Description |
|---|---|
| Once | displays the key name once at the moment it is activated and will then show the prefix and parameter value |
| Initial/Return | displays the key name when the key is selected but not active, and will display the prefix and parameter value when in use. This mode works well for continuously changing sources, but not for toggles. When the display is showing a source value and the slew causes the output to persist after the foot is off the key, the display will no longer be updated, even though the parameter is still being altered |
| Immed Param | displays the prefix and parameter value when that key is the currently activated key. The key name does not show up in this mode |

The green and red LED modes for controlling operation of the LED associated with each the SoftStep™ keys are also very useful. Each key can be configured to show a red light or a green light in certain circumstances. There are several different modes for each light as shown in Table 8.

TABLE 8

| LED Mode | Description |
|---|---|
| None | the light will not come on in this mode |
| True | the light will come on when the output of the key is above 0 |
| False | the light will come on when the output of the key is 0 |
| Flash True | the light will flash repeatedly when the output of the key is above 0 |
| Flash False | the light will flash repeatedly when the output of the key is 0 |
| Flash Fast True | the light will flash quickly when the output of the key is above 0 |
| Flash Fast False | the light will flash quickly when the output of the key is 0 |
| Blink True | the light will blink once when the output of the key goes above 0 |
| Blink False | the light will blink once when the output of the key goes to 0 |

If there are multiple modlines for one key, different modes may be configured for the LED lights with each modline, but only one can be the active modline for the LED display. That is the purpose of the little unlabeled button next to the display mode drop-down menus. Whichever modline has the button next to the LED mode selectors illuminated is the one that will send data to the SoftStep™ controller for LED display information. The reminder field next to that is provided so the user can make a note about the modline he created, e.g., to remind the user about the purpose of the modline.

Figure 12:
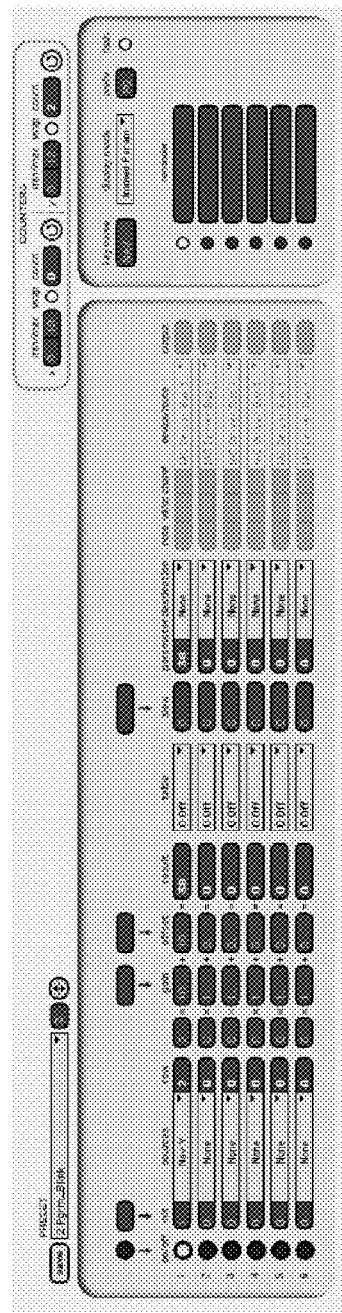

Referring again to FIG. 6, selection of the modulation box in the Nav Pad control block in the main window of the SoftStep™ application brings up the modulation window for the Nav Pad (as shown in FIG. 12) allowing the user to edit the parameters in the displayed preset. As shown, the Nav Pad modulation window is similar to the modulation windows for each of the 10 SoftStep™ keys. The modline functions are similar to those discussed above with reference to Table 5. One key difference is the portion of the interface in the upper right hand corner labeled "Counters." This indicates that the Nav Pad value will wrap around the min and max value set to the left. For example, if the min value for a parameter is set to 5 and the max is set to 120, stepping on the pad again when the value is 120 will set it back to 5. The counter can be reset for each axis by clicking on the little circling arrow.

The Nav Pad modulation window also includes a flash button for the alpha-numeric display. Activation of this control causes the display box to flash. This may be useful, for example, in the "ProgramChange" main preset of the Soft-Step™ in which the Nav Pad display is set to flash to indicate that data have not yet been sent out.

While the invention has been particularly shown and described with reference to specific embodiments thereof, it will be understood by those skilled in the art that changes in the form and details of the disclosed embodiments may be made without departing from the spirit or scope of the invention. For example, although embodiments have been described herein that relate to musical performance and recording, other applications of the multi axes controllers enabled by the present invention are contemplated. Such applications include, for example, editing video, controlling layered functions in graphics and computer aided design (CAD) programs and emulating other computer controllers. For example, the SoftStep can output data formatted similarly to a Waccom type "dig pad" or writing surface. The dig pad can detect the angle and pressure of the pen as well as its x-y location. Data appearing in this format would be easily mapped to graphics and CAD programs allowing more rapid data manipulation.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A controller, comprising:
a substrate;
a plurality of pressure-sensitive regions arranged on the substrate, each pressure-sensitive region having one or more sensors associated therewith configured to generate one or more output signals that are monotonically representative of time-varying pressure applied to the one or more sensors via the associated pressure-sensitive region;
a processor configured to receive the one or more output signals from the one or more sensors associated with each pressure-sensitive region and generate control information in response thereto, the processor being further configured to map the control information for each pressure-sensitive region to a selected one of a plurality of preset control functions associated with that pressure-sensitive region, the preset control functions being for controlling operation of one or more processes or devices in communication with the controller, wherein each of a plurality of sets of the preset control functions associates a particular one of the preset control functions with each of the pressure-sensitive regions;
a navigation control configured to select from among the plurality of sets of the preset control functions; and
an interface for communicating with the one or more processes or devices.

2. The controller of claim 1 wherein the one or more sensors associated with each pressure-sensitive region comprise two or more sensors, and wherein the one or more output signals generated by the two or more sensors associated with each pressure-sensitive region are also representative of one or more directions of the pressure applied to the pressure-sensitive region.

3. The controller of claim 2 wherein the one or more directions of the pressure applied to the pressure-sensitive region are relative to a surface of the pressure-sensitive region and include a clockwise rotation, a counter-clockwise rotation, a first linear direction along a first axis, and a second linear direction along a second axis.

4. The controller of claim 2 wherein the one or more output signals for each pressure-sensitive region comprise a plurality of output signals corresponding to the associated plurality of sensors, each of the plurality of output signals for each pressure-sensitive region representing a contribution to the one or more directions of the pressure applied to the pressure-sensitive region.

5. The controller of claim 1 wherein each of the sensors comprises a piezo-resistive material having an electrical resistance which changes with the pressure.

6. The controller of claim 1 wherein the processor is further configured to process the output signals received from the sensors associated with adjacent ones of the pressure-sensitive regions to determine which of the adjacent pressure-sensitive regions was activated.

7. The controller of claim 1 wherein at least some of the control information comprises musical instrument digital interface (MIDI) messages, the controller further comprising a MIDI interface configured to facilitate communication of the MIDI messages from the processor to an external MIDI device.

8. The controller of claim 1 wherein the one or more processes or devices comprises a computing device on which a software application is running, and wherein the control information is provided to the computing device for use by the software application.

9. The controller of claim 1 wherein the control information includes either or both of musical instrument digital interface (MIDI) messages or Ethernet messages.

10. The controller of claim 1 further comprising a status indicator associated with each pressure-sensitive region representing an activation state of the associated pressure sensitive region.

11. The controller of claim 1 wherein the processor is configured to save the plurality of preset control functions for each pressure-sensitive region.

12. The controller of claim 11 wherein the processor is configured to save each of the sets of the preset control functions for all of the pressure-sensitive regions as a scene.

13. The controller of claim 12 wherein the processor is configured to save a sequence of the scenes as a setlist.

14. The controller of claim 13 wherein the navigation control is further configured to facilitate navigation among the scenes of the setlist.

15. The controller of claim 14 wherein the processor is further configured to save a last state of a first one of the scenes upon navigation away from the first scene, and to return to the last state of the first scene upon navigation back to the first scene.

16. The controller of claim 1 wherein the processor is programmable to configure sensitivity to the pressure for the one or more sensors associated with each pressure-sensitive region.

17. The controller of claim 16 wherein the one or more output signals generated by the one or more sensors associated with each pressure-sensitive region are also representative of one or more directions of the pressure applied to the one or more sensors, and wherein the processor is programmable to configure sensitivity to the pressure for each of the one or more directions.

18. A computer-program product for configuring a controller, the controller including a plurality of pressure-sensitive regions configured to generate output signals that are monotonically representative of time-varying pressure applied to each of the pressure-sensitive regions, the output signals further being representative of one or more directions of the pressure applied to each of the pressure-sensitive regions, the controller further comprising a processor configured to receive the output signals and generate control information in response thereto, the computer program product comprising one or more computer-readable storage media having computer program instructions stored therein that are configured to cause one or more computing devices executing the instructions to:
- program the processor to configure sensitivity to the pressure for each of the one or more directions for each pressure-sensitive region;
- program the processor to map the control information corresponding to each of the pressure-sensitive regions to a plurality of preset control functions for control of one or more destination processes or one or more destination devices by the controller via an interface of the controller;
- program the processor to select for each pressure-sensitive region one of the plurality of preset control functions associated with that pressure-sensitive region, wherein each of a plurality of sets of the preset control functions associates one of the preset control functions with each of the pressure-sensitive regions; and
- program the processor to configure a navigation control to select from among the plurality of sets of the preset control functions.

19. The computer program product of claim 18 wherein the computer program instructions are further configured to cause the one or more computing devices executing the instructions to program the processor to configure a status indicator associated with each pressure-sensitive region to represent an activation state of the associated pressure sensitive region.

20. The computer program product of claim 18 wherein the computer program instructions are further configured to cause the one or more computing devices executing the instructions to program the processor to save the plurality of preset control functions for each pressure-sensitive region.

21. The computer program product of claim 20 wherein the computer program instructions are further configured to cause the one or more computing devices executing the instructions to program the processor to save each of the sets of the preset control functions for all of the pressure-sensitive regions as a scene.

22. The computer program product of claim 21 wherein the computer program instructions are further configured to cause the one or more computing devices executing the instructions to program the processor to save a sequence of the scenes as a setlist.

23. The computer program product of claim 18 wherein the one or more directions of the pressure applied to each pressure sensitive region is relative to a surface of the pressure-sensitive region and include a clockwise rotation, a counter-clockwise rotation, a first linear direction along a first axis, and a second linear direction along a second axis.

24. The computer program product of claim 18 wherein the one or more destination processes or one or more destination devices are taken from a group consisting of: a musical instrument digital interface (MIDI) device, a software process configured to receive MIDI messages, an open sound control (OSC) device, a software process configured to receive OSC messages, an Ethernet device, a software process configured to receive Ethernet messages, a video editing software process, a computer aided design (CAD) software process, a graphics design software process, an analog device, a musical instrument, and an expression pedal.

25. The computer program product of claim 18 wherein the control information includes either or both of musical instrument digital interface (MIDI) messages or open sound control (OSC) messages.

* * * * *